United States Patent [19]

Larson et al.

[11] 4,356,599
[45] Nov. 2, 1982

[54] STACKABLE FLAT CABLE CLAMP

[75] Inventors: Roderick W. Larson; Dean K. Reidt, both of Saint Paul, Minn.

[73] Assignee: Minnesota Mining and Manufacturing Company, Saint Paul, Minn.

[21] Appl. No.: 218,056

[22] Filed: Dec. 19, 1980

[51] Int. Cl.³ ............................................. B65D 63/00
[52] U.S. Cl. .............................. 24/16 PB; 24/248 B; 248/74 PB
[58] Field of Search ............ 24/16 PB, 17 AP, 248 R, 24/248 B; 248/68 CB, 68 R, 74 PB; 339/198 G, 198 H

[56] References Cited

U.S. PATENT DOCUMENTS

| | | | |
|---|---|---|---|
| 3,627,942 | 12/1971 | Bobb | 339/198 G |
| 3,848,951 | 11/1974 | Michaels et al. | 339/198 H |
| 3,872,416 | 3/1975 | Kinasi | 339/198 G |
| 3,906,592 | 9/1975 | Sakasegawa et al. | 248/74 PB |
| 4,046,452 | 9/1977 | Cassarly | 339/198 H |
| 4,221,352 | 9/1980 | Caveney | 248/74 |

Primary Examiner—Robert A. Hafer
Attorney, Agent, or Firm—Cruzan Alexander; Donald M. Sell; Terryl K. Qualey

[57] ABSTRACT

A one piece, plastic, flat cable clamp has a base, a pair of end walls on the base and a cover hinged on one of the end walls to fold over and extend across the base in a latched closed position to retain a plurality of flat cables between the cover and base. The cable clamp is stackable on an identical cable clamp, the base of the upper cable clamp being positioned on the cover of the lower cable clamp and being retained thereon when its cover is in the latched closed position.

4 Claims, 5 Drawing Figures

STACKABLE FLAT CABLE CLAMP

BACKGROUND OF THE INVENTION

Flat cables consist of a multiplicity of conductors embedded in a flat insulating plastic, the conductors most commonly being parallel to each other. Cable clamps are used to hold flat cables in an orderly arrangement in, for example a computer. Two or more cables often run in the same direction for some distance and, therefore, it is often desirable to mount a plurality of cables with a single cable clamp. The prior art includes U-shaped cable clamps with spring loaded legs to accommodate a plurality of flat cables but from which cables are too easily removed for many applications. A clamp more securely retaining the flat cables is disclosed in U.S. Pat. No. 3,971,105; but this clamp consists of three pieces, making it overly expensive and cumbersome to use. More recently, a one piece plastic cable clamp with a latching cover has been developed, as disclosed in U.S. Pat. No. 4,221,352. This cable clamp, however, suffers from the deficiency that when its capacity is fully used a new longitudinal run must be found for any further cables.

SUMMARY OF THE INVENTION

The present invention provides a one piece, plastic, stackable, flat cable clamp comprising a flat base, a pair of end walls extending from opposite ends of the base in the same direction perpendicular to the base and a cover hinged on a first of the end walls to fold over and extend across the base in its closed position. Resiliently deformable means extend into the space between the base and the furthest spaced portion of the cover in its closed position and is resiliently deformable by a plurality of flat cables between the base and the cover. The cover and the second of the end walls are complementarily formed with means for latching the cover in its closed position over the base to retain flat cables between the base and the cover and a portion of the second end wall extends further from the base than the cover in its closed position. The base, the cover and the extended portion of the second end wall are complementarily formed with means for retaining a second identical flat cable clamp with its base on the cover of the first cable clamp in its closed position.

The cable clamp of the present invention thus provides for retention of a plurality of flat cables in the clamp and, when it is full, a second identical cable clamp may be mounted on the first cable clamp to hold additional flat cables in parallel with the cables in the first cable clamp.

THE DRAWING

Figure 4:
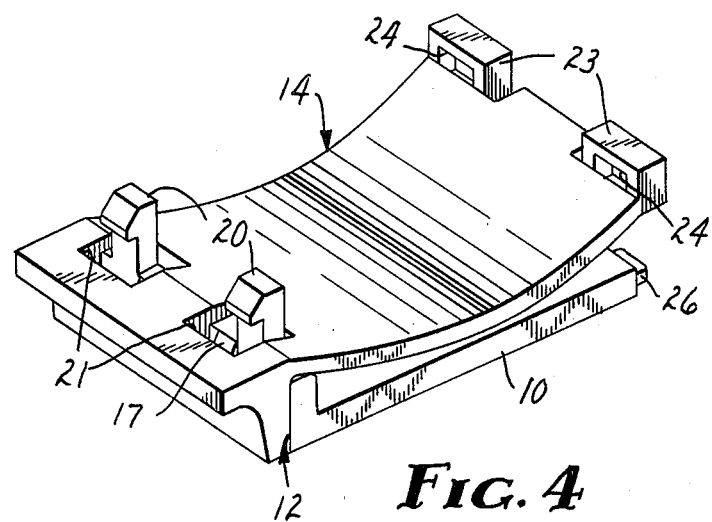
FIG. 4 is a perspective view of the cable clamp of FIG. 1 with the cover in a latched closed position.
Figure 5:
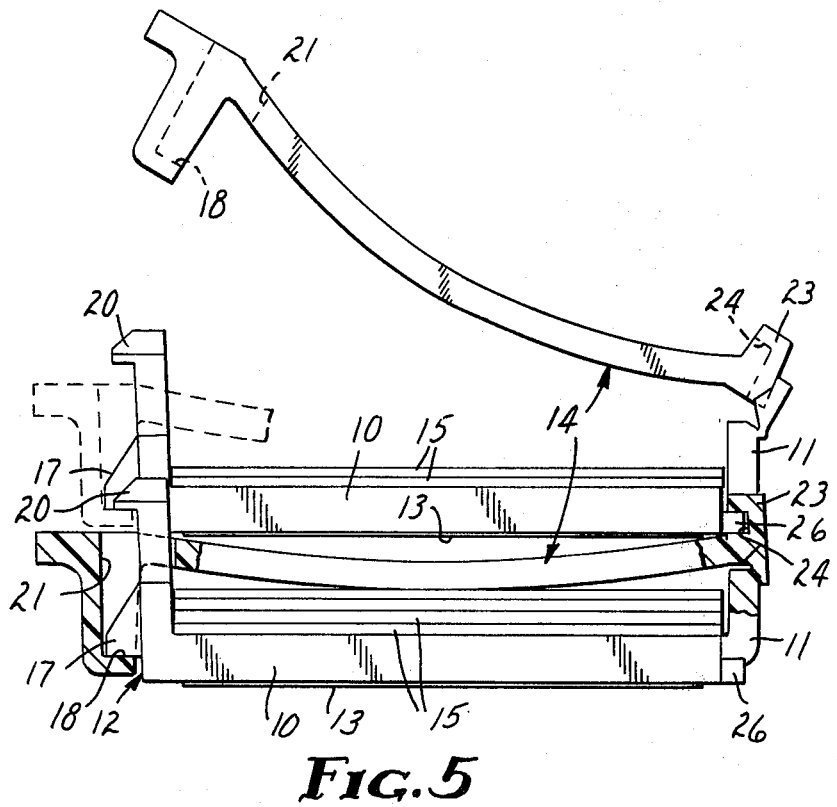
FIG. 5 is a side elevation view, partially in section, of two of the cable clamps illustrated in FIGS. 1–4, one of the cable clamps being stacked on the other; the top clamp being illustrated with its cover in an open position in full lines and in a closed position in phantom lines.

The flat cable clamp of the present invention comprises a flat base 10, a pair of end walls 11 and 12 extending from opposite ends of the base 10 in the same direction from and perpendicular to the base, and a cover 14 hinged on the rear end wall 11 to fold over and extend across the base 10 in its closed position illustrated in FIGS. 4 and 5. It is preferably molded of polypropylene. Holes are provided in the base 10 for screws which may be used to mount the cable clamp in a cabinet and the exterior of the base has a pressure sensitive adhesive mounting tape 13 applied to it to provide a second mounting alternative.

Resiliently deformable means is in the space between the base 10 and the furthest spaced portion of the cover 14 in its closed position, said means being resiliently deformable by a plurality of flat cables between the base and the cover to positively retain one or more flat cables in the clamp. In the illustrated embodiment the resiliently deformable means comprises the cover 14 being bowed across its width toward the base 10 and being made of a proper thickness so that it will act as a spring to apply pressure on one or more flat cables in the clamp without applying excessive pressure which might damage the flat cables.

The cover 14 and the front end wall 12 are complementarily formed with means for latching the cover in its closed position over the base 10 to retain flat cables 15 between the base and the cover. In the illustrated embodiment the front end wall 12 is formed with two wedge shaped latching projections 17 and the cover is formed with complementary latching recesses 18.

Figure 1:
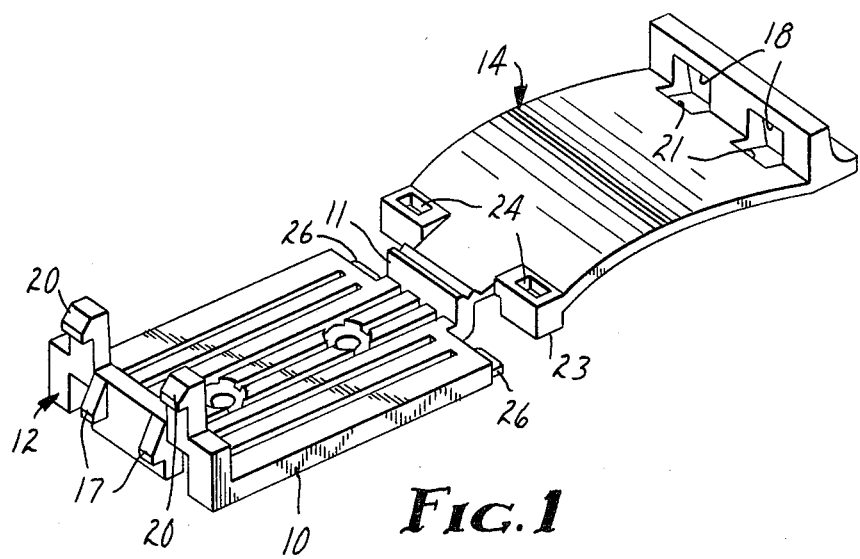
FIG. 1 is a perspective view of a flat cable clamp made in accordance with the present invention with its cover in an open position.
Figure 2:
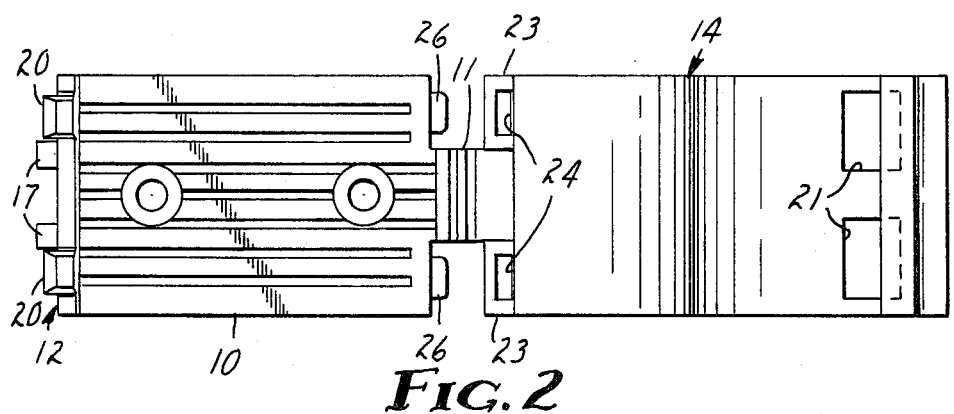
FIG. 2 is a top view of the cable clamp in the position illustrated in FIG. 1.
Figure 3:
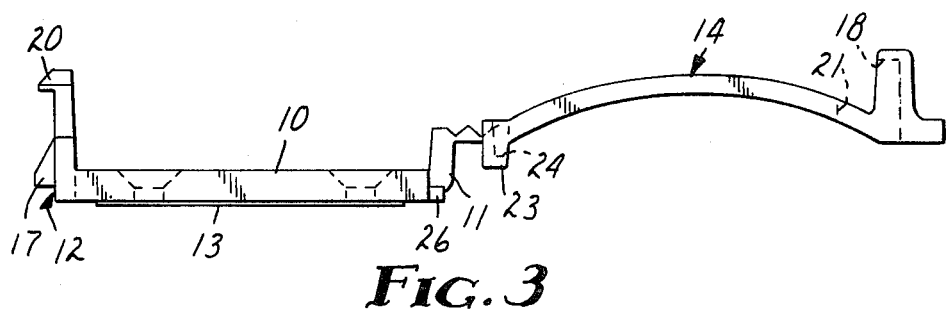
FIG. 3 is a side elevation view of the cable clamp in the position illustrated in FIG. 1.

A portion of the front end wall 12 extends further from the base 10 than the cover 14 in its closed position and the base 10, the cover 14 and the extended portion of the second end wall are complementarily formed with means for retaining a second identical flat cable clamp with its base on the cover of the first cable clamp in its closed position. In the illustrated embodiment, the extended portion of the front end wall 12 is formed as a pair of latching posts 20 formed at their upper ends with latching wedges projecting from the plane of the front end wall 12 similar to the cover latching projections 17. The latching posts 20 lie to the sides of the cover latching projections 17 widthwise of the cable clamp (i.e. when viewed from the top of the cable clamp as in FIG. 2, the latching posts 20 lie to the sides of the cover latching projections 17). The cover 14 is formed with apertures 21 through which the latching posts 20 extend above the cover in its closed position as illustrated in FIG. 4.

To each side of the hinge area the cover 14 is formed with a rectangular block 23 projecting from its upper surface. The blocks 23 are formed with rectangular recesses facing the front of the clamp in the closed position of the cover. A pair of retention projections 26, spaced apart the same distance and having the same cross section as the recesses 24, extend from the end of the base 10 adjacent the rear end wall 11. The recesses 24 in the blocks 23 on the cover 14 provide retention receptacles for the retention projections 26 on a second identical cable clamp. Thus, referring to FIG. 5, after a desired number of flat cables 15 have been placed in a cable clamp and the cover 14 is latched closed, a second cable clamp may be stacked on top of it with the retention projections 26 thereof fitting into the recesses 24 in the blocks 23 on the cover of the lower cable clamp. The latching posts 20 from the bottom clamp extend above the cover 14 of the bottom clamp a distance such that when the base of the upper cable clamp rests on the cover of the lower cable clamp, the lower latching surface of the cover latching projection 17 on the upper cable clamp are in the same plane as the lower latching surface on the latching post 20. Each of the latching recesses 18 in the forward edge of the cover 14 is made wide enough to accommodate a cover latching projection 17 and a latching post 20. Thus, when the cover 14 of the upper cable clamp is closed and latched, its latching recesses 18 latch on both the cover latching projections 17 of the upper cable clamp and the latching post 20 of the lower cable clamp, thereby firmly retaining the upper cable clamp on the lower cable clamp.

We claim:

1. A one piece, plastic, stackable, flat cable clamp comprising:

a flat base, a pair of end walls extending from opposite ends of said base in the same direction from and perpendicular to said base, a cover hinged on a first of said end walls to fold over and extend across said base in its closed position, and resiliently deformable means in the space between said base and the furthest spaced portion of said cover in its closed position, said means being resiliently deformable by a plurality of flat cables between said base and said cover;

said cover and the second of said end walls being complementarily formed with means for latching said cover in its closed position over said base to retain flat cables between said base and said cover, a portion of said second end wall extending further from said base than said cover in its closed position, and said base, said cover and said extended portion of said second end wall being complementarily formed with means for retaining a second identical flat cable clamp with its base on the cover of the first cable clamp in its closed position.

2. The flat cable clamp of claim 1 wherein said means for retaining a second flat cable clamp includes a pair of latching posts projecting from said second wall beyond said cover in its latched closed position which are engaged by the cover of the second identical flat cable clamp when it is in its latched closed position.

3. The flat cable clamp of claim 2 wherein said means for retaining a second flat cable clamp further includes a pair of retention projections from the end of said base adjacent said first end wall and pair of complementary retention receptacles on the outside of said cover adjacent said first end wall for receipt of the pair of retention projections on the second flat cable clamp.

4. The flat cable clamp of claim 1, 2 or 3 wherein said resiliently deformable means comprises said cover being bowed across its width toward said base.

* * * * *